United States Patent [19]

Arai et al.

[11] Patent Number: 4,672,395
[45] Date of Patent: Jun. 9, 1987

[54] OPTICAL FUNGICIDE-TREATED INFORMATION RECORDING AND REPRODUCING MEDIUM

[75] Inventors: Kazuo Arai; Shinichi Nishi; Taxey Satoh; Yasushi Kawaguchi; Kiyomitsu Mine, all of Hino, Japan

[73] Assignee: Konishiroku Photo Industry Co., Ltd., Tokyo, Japan

[21] Appl. No.: 782,067

[22] Filed: Sep. 30, 1985

[30] Foreign Application Priority Data

Oct. 2, 1984 [JP] Japan ................................. 59-205535
Oct. 2, 1984 [JP] Japan ................................. 59-205536

[51] Int. Cl.⁴ ..................... G01D 15/34; A01N 37/00; G03G 5/00
[52] U.S. Cl. ............................... 346/135.1; 346/76 L; 346/137; 346/1.1; 430/138; 430/293; 430/495; 430/945; 369/284; 514/372; 514/365; 514/394; 514/701; 514/736; 514/525; 514/417; 514/516
[58] Field of Search ............ 346/135.1, 1.1, 76 L, 346/137; 514/558; 424/273 B, 314, 320; 430/138, 293, 995, 945; 369/284

[56] References Cited

U.S. PATENT DOCUMENTS 4,450,452  5/1984  Ando et al. .................... 346/135.1
4,473,585  9/1984  Abrahamsson et al. ........ 424/318 X
4,504,565  3/1985  Baldvins et al. ................ 430/138 X
4,517,574  5/1985  Cornet ............................ 346/135.1

FOREIGN PATENT DOCUMENTS

56-83851  7/1981  Japan .

Primary Examiner—E. A. Goldberg
Assistant Examiner—Gerald E. Preston
Attorney, Agent, or Firm—Frishauf, Holtz, Goodman & Woodward

[57] ABSTRACT

The combination of an optical information recording and reproducing medium and a container for storing said optical information recording and reproducing medium, at least one of said optical information recording and reproducing medium and said container comprising a fungicide wherein said fungicide is in a layer selected from the group consisting of a layer comprising fine metal particles dispersed in a hydrophilic colloid dispersion medium; a layer comprising a metal or an alloy formed by a vacuum evaporation method or a sputtering method; and a layer comprising a coloring substance or consisting essentially of a polymeric substance. The invention also provides said medium when it contains a fungicide and a method for making the claimed combination and components thereof.

27 Claims, 8 Drawing Figures

OPTICAL FUNGICIDE-TREATED INFORMATION RECORDING AND REPRODUCING MEDIUM

BACKGROUND OF THE INVENTION

This invention relates to a recording medium for a reproducing or a recording and reproducing of an optical information.

Recent years, there has been given a great attention to an optical information recording medium wherein such information as voice and image are recorded as variation in shape, dimension and the like of pit (or concave) or block (or convex) and then optically read out to reproduce such voice, image and the like. There have already been put to practical use a variety of recording media, for example, an optical disc to be used for reproducing only, an optical disc capable of directly writing and directly reading, the so-called DRAW (i.e., Direct Read After Write) and so on, and they have been widely utilized for various purposes of document filing, image filing, audio system or computer memory.

Such a recording medium should be frequently received in a container, in order to prevent it from adhesion of dust, prevent it from adhesion of stains by direct touch with fingers of any persons dealing with it or simplify its handling. As the container, there have been known various forms depending upon the purposes of their utility, for example, for a cartridge-type, a jacket-type or a jukebox-type. From the functional point of view, there have been proposed, for instance, a container which is so constructed as to accomplish reproducing or recording with a recording medium as received or a container wherein a recording medium is drawn out and then reproducing or recording may be accomplished. The recording medium, unless being reproduced or recorded, should be stored in such container.

Although, a recording medium should be prepared under an extremely clean environment, fungi such as mold and the like may adhere to the recording medium, or fungi such as mold may be considerably present in the place where the recording medium is to be handled, e.g., in an office space or indoors at common houses and such fungi may adhere to recording media or containers, whereby mold may propagate under ordinary environmental conditions where the recording media is stored. Consequently, there have been presented problems of various harmful effects caused by mold. For example, if any mold propagates over a transparent base panel of the recording medium, through which a reproducing light or a recording light may pass, said reproducing or recording light could not sufficiently irradiate the recording medium because of the effect of the mold and there have been posed those problems of a lowered CN ratio, a generated sensitivity irregularity, an increased error rate and others. Moreover, if any mold grows in the recording medium, there have been problems of variation in absorbance or reflectance of the recording medium or variation in physical properties such as heat conductivity or hardness to bring reduction in sensitivity or varied shape of pits or blocks. If an adhesive is employed for constituting the record medium, propagation of molds on the adhesive would cause a lowered adhesivity and then a reduced mechanical durability. If any molds propagate on the container for the recording medium, there have been the following problems; when a mold may grow on an outer frame, a dealing person may be subjected to molds and further a record-reproducing apparatus may be sustained with molds to damage environmental hygiene. When a mold may grow at a movable part in a jukebox-type container, movement of said movable parts would be disturbed and the container would be out of order. When a mold may grow on a sealing material in the container with a sealed structure, said sealing material would be denatured and said sealed structure would be broken. In the case where the container is to be constructed with an adhesive, if a mold may grow in said adhesive, adhesivity would be decreased to break the container. Further, the mold grown in the container would transfer to the recording medium which is put in the container, thereby presenting the above-mentioned problems.

SUMMARY OF THE INVENTION

This invention has been completed upon the aforesaid circumstances. A primary object of this invention is to provide an optical information recording medium, which can prevent a mold from propagation and can provide an expected performance over a prolonged period of time, without any disturbance caused by a mold or mildew.

The above object can be accomplished by the present optical information recording medium for the reproducing or recording and reproducing of optical information characterized in that a fungicide is included in the material of or provided on some component thereof or the recording medium is put in a container in which a fungicide is included in the material of or provided on some component thereof.

DESCRIPTION OF THE PREFERRED EMBODIMENT

Figure 1A:
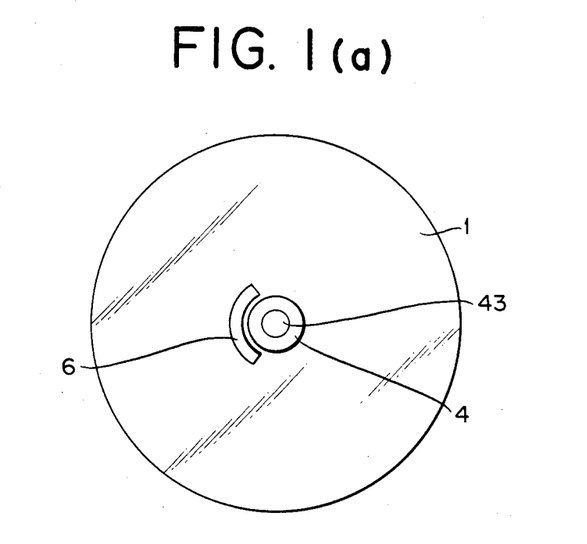
FIG. 1(a) is a top plan view of one example of disc-type recording media and FIG. 1(b) is a vertical sectional side elevation view showing an enlarged main part of the medium in FIG. 1(a).
Figure 1B:
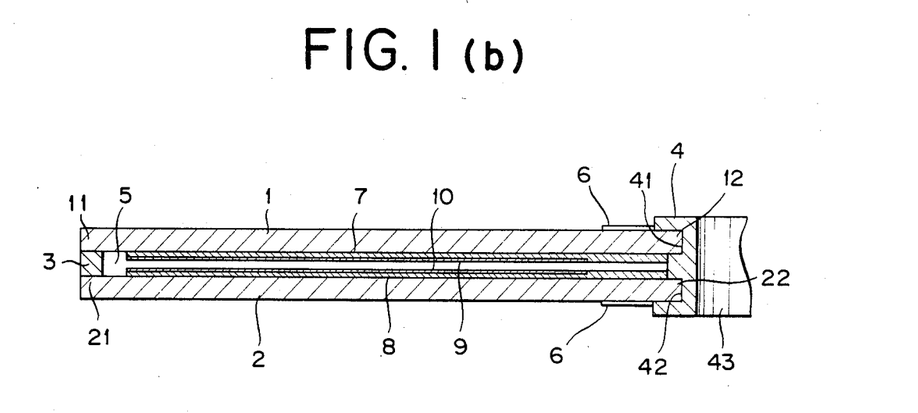

FIGS. 1(a) and 1(b) show one example of recording media with an optical disc type where are of rotating disc shape and reproducing or recording of information can be made on both sides thereof. In FIGS. 1(a) and 1(b), (1) and (2) are transparent doughnut sheet-like basic panels composed of, e.g., polymethyl methacrylate, respectively, the base panels (1) and (2) are located in parallel. (3) is a cyclic spacer composed of, e.g., polymethyl methacrylate and the spacer (3) is adhered and fixed at the upper and lower surfaces onto the base plates (1) and (2) with an adhesive, respectively, at the outer circumferential edges (11) and (21) thereof. (26) is a center hub composed of, e.g., a vinyl chloride resin and cyclic engaging channels (41) and (42) provided at the upper part and lower part in the outside part of the center hub (4) are engaged with the inner circumferential parts (12) and (22) of the base panels (1) and (2) and fixed with an adhesive. (43) is a through hole for fixing a position which is placed at the center of the center hub (4). The sealed space (5) is formed by dividing with the base panels (1) and (2), the spacer (3) and the center hub (4) and filled with an inert gas. (6) is a label composed of, e.g., paper and the like. (7) and (8) are pre-groove layers composed of a doughnut sheet-like thin film, which is formed by laminating on the sealed space (5) side of the base panels (1) and (2), respectively, and the pre-groove layers (7) and (8) are provided with a tracking channel and concave-convex for indicating address (not shown). (9) and (10), respectively, indicate a recording layer composed of a doughnut sheet-like thin film, which is further laminated over the pre-groove layers (7) and (8) so as to be exposed into the sealed space (5).

One example of concrete dimensions of the recording media is that a thickness of each of the base panels (1) and (2) is 1.2 mm, a thickness of the spacer (3) is 1:2 mm, a diameter of the whole is 20 cm and a thickness of other parts than the center hub (4) is 3.6 mm.

Figure 4:
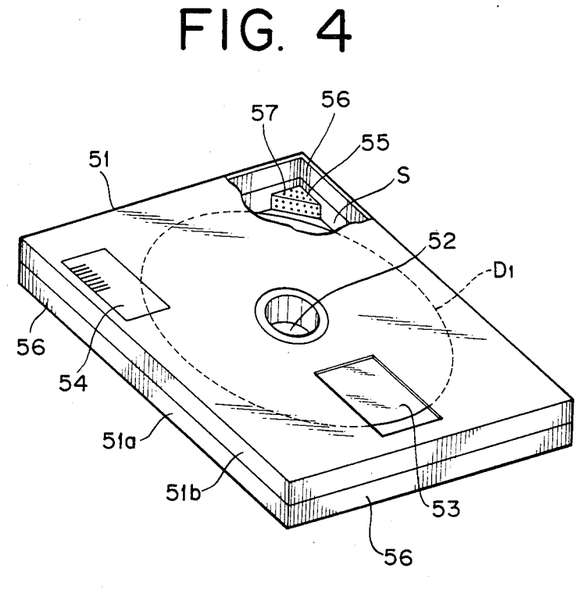
FIG. 4 is a partly broken perspective view of one example of cartridge-type containers.

FIG. 4 shows one example of cartridge-type containers which can process reproducing or recording as a rotating disc recording medium is put. In FIG. 1, (51) is a cartridge outer frame and the outer frame (51) is constructed with a pair of frame members (51a) and (51b) mutually adhered and fixed with an adhesive so as to form a receiving space (S). (52) is a hole for inserting a rotation axis and the hole for inserting a rotation axis (52) is closed by means of a mechanism (not shown) to make the interior of said container to a sealed structure from the outside when the container is not equipped in a recording or reproducing apparatus. (53) is a window part for light passage and the window part (53) is usually closed with a shutter (not shown). When equipped in a record-reproducing apparatus, the window part is opened with a shutter and the recording layer of a recording medium may be irradiated with a reproducing light or a recording light through the window part (53). (54) is a label for taking a memo. (D1) is a rotating disc-type recording medium which is put in the receiving space (S) within the cartridge outer frame (51) so as to be coaxially rotatable through the hole for inserting a rotation axis (52).

According to this invention, the fungicide is incorporated in the material of or provided on some component of the recording medium or its container; illustratively, there may be employed, for instance, the following constitutions for the recording medium.

(a) Constitution to mount a coated film containing the fungicide by coating on a part or whole of either or both of the outer surfaces of the base panels (1) and (2), namely one surface opposed to the surface laminated with the pre-groove layers (7) and (8).

(b) Constitution to include the fungicide into either or both of the base panels (1) and (2) by incorporating the fungicide into the material for construction of the base panels (1) and (2) and molding the base panels from the material.

(c) Constitution to include the fungicide into the material for the pre-groove layers (7) and (8) by incorporating the fungicide into the said material and forming the pre-groove layers (7) and (8) therefrom.

(d) Constitution to mount a coated film containing the fungicide by previous coating between the base panels (1) and (2) and the pre-groove layers (7) and (8).

(e) Constitution to mount a coated film containing the fungicide by coating over the surface of the center hub (4).

(f) Constitution to include the fungicide into the material for the center hub (4) by incorporating the fungicide into the material for the center hub (4) in preparing the same and molding the center hub therefrom.

(g) Constitution to include the fungicide into the material for the spacer (3) by incorporating the fungicide into the material for the spacer in preparing the same and molding the spacer therefrom.

(h) Constitution to mount a coated film containing the fungicide by coating over the surface of the label (6).

(i) Constitution to include the fungicide into any adhesive layer of each part by incorporating the fungicide into the adhesive in said adhesive layer such as the adhesive layer between the spacer (3) and the base panels (1) and (2), the adhesive layer between the center hub (4) and the base panels (1) and (2) and the adhesive layer over the reverse side of the label (6) and forming said adhesive layer therefrom.

(j) Constitution to provide a fungicide receiving chamber in the center hub (4) or the spacer (3) and place the fungicide in said chamber.

Also, there may be used a constitution to incorporate further the fungicide in the recording layers (9) and (10) or to have a coated layer incorporating the fungicide on the surface thereof, but it is essential in this instance not to cause a lowered performance owing to changes in physical properties by the fungicide in recording layers.

With regard to the container,(55) of FIG. 4 is a holder box for a fungicide and a large number of vent hole (57) is provided in the outer wall of the box (55), the interior of which the fungicide is kept in. Illustratively, the fungicide may be absorbed onto, e.g., porous polymer beads and the fungicide is received within the box (55) integrally with such porous beads. The box (55) may be installed at any place within the receiving space (S) of a container, the presence of which does not produce any disturbance; namely, the remaining space which the disc-type recording medium D1 could not exclusively occupy, for example, all of the corner parts (56) on all sides in the receiving space (S) or any part of the corner parts.

In this instance, the fungicide kept within the box (55) may act upon the container and the recording medium D1 to prevent a mold from propagation or growth.

The fungicide may be included in the material of or provided on some component in a container; as explained above, there may be used the constitution to mount a box (55) for keeping the fungicide or one may use, for instance, the following constitutions.

(a) Constitution having a coated film containing the fungicide by coating the internal surface or external surface of the cartridge outer frame (51).

(b) Where the cartridge outer frame (51) is to be prepared by molding with a synthetic resin, e.g., a polyvinyl chloride resin, constitution to contain the fungicide in the material for the said cartridge outer frame (51) by incorporating the fungicide into the said resin material and then molding the frame (51).

(c) Constitution to mount a coated film containing the fungicide by coating the surface of an opening and closing shutter in the window part for light passage (53)

or to incorporate the fungicide into the material for the said shutter.

(d) Constitution to mount a coated film containing the fungicide by coating the surface of the label (54).

(e) Where a pair of frame members (51a) and (51b) is to be adhered and fixed with an adhesive in forming the cartridge outer frame (51), constitution in which the fungicide is incorporated in the adhesive and thereby the frame members (51a) and (51b) are adhered and fixed with the above adhesive to have incorporated in the adhesive layer.

If the fungicide is included in the material of or provided on some component in a container, a fungi-proofing effect by the fungicide may be exerted upon not only said part but the inside or outside of a container and, consequently, propagation of molds can be practically prevented satisfactorily in any of the container and recording media received therein.

As the fungicides which may be employed in this invention, there may be preferably used any of those which can prevent propagation of molds and also have a sufficiently high safety from the standpoint of environmental hygiene. Illustratively, there may be mentioned the following substances. However, they are not construed to be limiting thereto.

(1) Amide-type compounds
2-Octylisothiazolin-3-one

(2) Benzimidazole-type compounds
2-(14-thiazolyl) benzimidazole

Methylbenzimidazole carbamate

(3) α, β-Unsaturated carbonyl compounds
α-Bromo-cinnamyl aldehyde

(4) Inert chlorine compounds
Tetrachloroisophthalonitrile

(5) Phenol compounds
O-Phenylphenol

(6) N-Haloalkylthio compounds
N,N-Dimethyl-N'-phenyl-N'-fluorodichloromethyl-thiosulfamide N-(Fluorodichloromethylthio)-phthalimide (7) Thiocyanate-type compounds The fungicides may be applied alone or in combination of the two or more thereof. An amount of the fungicide to be used may vary depending upon the sort thereof, but could be determined in consideration of fungi-proofing effect and environmental safety.

With respect to the recording medium shown by FIGS. 1(a) and 1(b), as the material for the said base panels (1) and (2) and the spacer (3), there may be employed, in addition to polymethyl methacrylate, cellulose triacetate, polyethylene terephthalate, polycarbonates, polyimide resins, glass and the like. In order to improve adhesive properties between the base panels (1) and (2) and the pre-groove layers (7) and (8), said panels may be previously undercoated with, for example, a silane coupling agent, a silicate, a titanium coupling agent and the like.

As the material for the center hub (4), there may be employed, in addition to polyvinyl chloride, a polystyrene, a polycarbonate, a polypropylene, Tefron (trademark, available from E.I. Du Pont de Nemours & Co., Inc., polytetrafluoroethylene), and the like.

As the material for the pre-groove layers (7) and (8), there may be employed, for example, a resin such as an acrylic or methacrylic ultraviolet curing resin and the like.

The said recording layer (9) or (10) may have various constitutions such as the following ones;

(a) Constitution to have dispersed fine metal particles, e.g., copper or gold into a hydrophilic colloid dispersion medium, e.g., gelatin and the like, (b) Constitution by a thin film composed of a metal such as tellurium, aluminum or gold, or an alloy and formed by a vacuum evaporation method or a spattering method, and (c) Constitution by a thin film composed of a coloring substance or a polymeric substance and formed by a vacuum evaporation method or a coating method.

This invention is described above by referring to the rotating disc-type recording medium as shown in FIGS. 1(a) and 1(b), but this invention may be applicable to various types of recording media.

Figure 2:
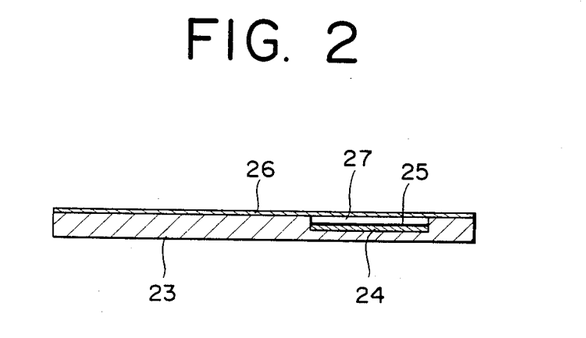
FIG. 2 is a sectional view of one example of card-type recording media.
Figure 3:
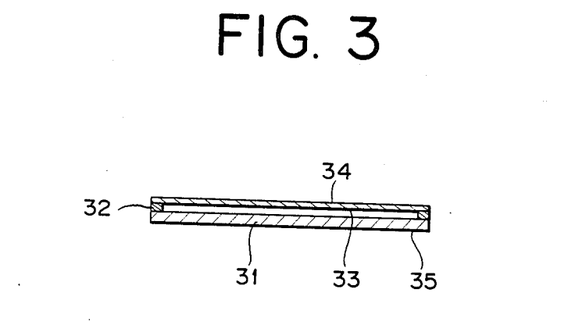
FIG. 3 is a sectional view of one example of sheet-type recording media capable of being stuck.
Figure 6:
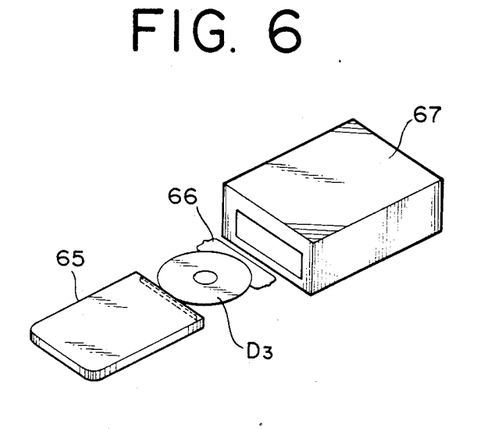
FIG. 6 is a perspective view of one example of jacket-type containers.

For instance, the present recording medium may also be prepared, record media such as a portable card-type recording medium as shown in FIG. 2 or a flexible, sheet-type recording medium which may be stuck on any optional place as shown in FIG. 3, by having the fungicide incorporated in the material of or provided on some component in the same manner as described above. In FIG. 6, (23) is a plastic card-type base, (24) is a support for recording medium, (25) is a recording layer, (26) is a transparent protective layer and (27) is a sealed space. In FIG. 3, (31) is a flexible sheet body, (32) is a spacer, (33) is a recording layer, (34) is a flexible support for recording medium and (35) is an adhesive layer for sticking.

By referring to a container of the type illustrated in FIG. 4, this invention is described hereinabove. This invention may be, however, applicable to a wide variety of recording media for optical information and containers therefor. Same of other application examples will be described below.

Figure 5:
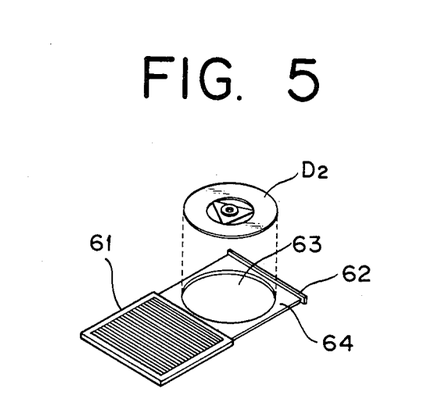
FIG. 5 is a perspective view of another type of cartridge-type containers.

FIG. 5 shows one example of the cartridge type container wherein a recording medium is taken out from a container in reproducing and recording and then reproducing or recording process is made. In FIG. 5, (61) is an outer frame, (62) is an inner frame of the drawer type and the inner frame (62) is fitted with the outer frame (61) for taking in and out freely. At the bottom (64) in the inner frame (62) is provided a concavity (63) for receiving a disc recording medium D2 so that the recording medium D2 is received in the concavity (63) and stored in the state of the inner frame (62) inserted into the outer frame (61). According to this invention, there can be constituted the present container by having the fungicide included in the material of or provided on some component, using, e.g., (a) constitution to mount a coated film containing the fungicide by coating the surface of the outer frame (61) or the inner frame (62), (b) constitution to include the fungicide into the material for the outer frame (61) or the inner frame (62), (c) constitution to place the fungicide into a fungicide containing part mounted to the inner frame (62) at the bottom (64) thereof, or (d) constitution to include the fungicide into an adhesive layer if the outer frame (61) or the inner frame (62) is formed by adhesion and fixing a plurality of members.

FIG. 6 shows one example of the jacket-type containers wherein a recording medium is taken out from a container in reproducing and recording and then reproducing or recording process is conducted. In FIG. 6, (65) is an outer frame, (66) is a lid member and a recording medium D3 is put and stored within the outer frame (65) under the state that an opening of the outer frame (65) is closed with the lid member (66), (67) indicating a reproducing apparatus of recording. According to this invention, there can be constituted the present container by having the fungicide included in the material of or provided on some component, using, e.g., (a) constitution to mount a coated film containing the fungicide by coating the surface of the outer frame (65) or the lid member (66), (b) constitution to include the fungicide into the material for the outer frame (65) or the lid member (66), (c) constitution to have the fungicide contained in a fungicide holder box placed at a corner part within the outer frame (65), or (d) constitution to include the fungicide into an adhesive layer if the outer frame (65) or the lid member (66) is formed by adhesion and fixing a plurality of members with an adhesive.

Figure 7:
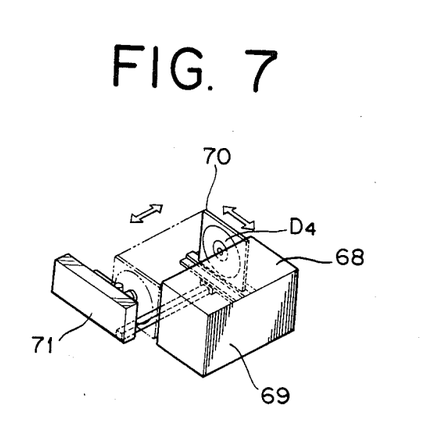
FIG. 7 is a perspective view of one example of jukebox-type containers.

FIG. 7 shows one example of a jukebox-type container comprising an integral combination of a container with a large capacity and a reproducing apparatus. In FIG. 7, a container (68) is of a box type and a large number of optical discs (e.g., approximately 50 sheets) is longitudinally placed and put in a single line from an optical disc inserting inlet (69) in the container (68). The indicated optical disc D4 is selected and drawn out from the optical discs which are put in the container (68) by means of an optical cisc carrier (70), the optical disc D4 is carried to an optical disc player (71) and the optical disc D4 is reproduced in said player and, after completion of the processing, the disc is returned back to the originally received position within the container (68) by means of the optical disc carrier (70). According to this invention, there can be constituted the present container by having the fungicide included in the material of or provided on some component thereof, using, e.g., (a) constitution to mount a coated film containing the fungicide by coating the outer surface or the inner surface of the container, (b) constitution to include the fungicide into the material for the container, (c) constitution to have the fungicide received in a fungicide holder box placed at a corner part within the container, or (d) constitution to include the fungicide into an adhesive layer if the container is formed by adhesion and fixing a plurality of material with an adhesive. Such a jukebox-type of the container which is usually put a number of recording media and, if a mold happens to grow in a container or recording media which is put therein, many recording media would be instantly damaged and furhter even a reproducing apparatus would be in a danger of being damaged by a mold; however, as the fungicide is included in the material of or provided on some component in a container in this invention, a mold can be prevented from propagation and thus all recording media which is put and containers as well as reproducing apparatus do not undergo any damage by a mold and can exert a stable, expected performance over a prolonged period of time, without presenting any environmental pollution problems owing to a mold.

This invention is described above in detail with reference to some concrete embodiments, but the present recording medium has a characteristic constitution that the fungicide is included in the material of or provided on some component thereof or that the recording medium is received in a container in which a fungicide is included in or carried on any component parts thereof, so that a fungi-proofing effect of the fungicide may exerted upon the recording medium and its container. Therefore, a mold could be prevented from propagation in all of containers and recording media. Thus, there could not be presented those problems caused by mold propagation such as problems of a lowered CN ratio caused by insufficient irradiation of a reproducing light or a recording light, if a mold grows on a transparent base panel of a recording medium, a produced sensitivity irregularity or an increased error rate and the like; problems of a reduced sensitivity caused by changes in physical properties of a recording medium, e.g., absorbance, reflectance, heat conductivity or hardness where a mold grows in a recording medium, production of noise caused by changes in shape of pit or block and the like; problems of a decreased mechanical durability caused by a reduced adhesivity where a mold grow in an adhesive layer; problems of deterioration of environmental hygiene caused by mold polution in a container, of a poor motion of any movable parts where mounted, of breaking of container caused by deterioration of an adhesive layer. In the end, this invention can provide an improved recording medium, in which an expected performance can be constantly obtained over a prolonged period of time under usual environmental condition and even under such poor environmental condition as at a higher temperature and a higher humidity, and a recording medium can constantly show a good CN ratio, a high sensitivity and a lower error rate without any reduced performance over a prolonged period of time.

In order to demonstrate a superior effect of the present recording medium, some experiments will be given below.

EXPERIMENT 1

Following the construction as shown in FIGS. 1(a) and 1(b), the fungicide having the under-mentioned structural formula, 2-(4-thiazolyl)benzimidazole, was incorporated into the material for the base plates (1) and (2) composed of polymethyl methacrylate at a proportion of 0.1% by weight to prepare 3 recording media of this invention. They were designated "Sample 1 to Sample 3", respectively.

Structural formula

In this recording medium, the base panel had a thickness of 1.2 mm and the spacer was made of polymethyl methacrylate and had a thickness of 1.2 mm, the center hub was made of a vinyl chloride resin and the recording layer was composed of a hydrophilic colloid dispersion medium having dispersed therein fine copper particles and had a reflectance of 40% to a light with a wave length of 830 Said recording layer was of such a type that pit lines were formed by removing with irradiation of a high density energy beam to record information and then the pit lines were irradiated with a reproducing high density evergy beam to read out the reflection light, whereby the recorded information can be reproduced. And, the spacer was adhered and fixed with the base panel and the center hub with the base panel, respectively, with an epoxy adhesive. The recording medium had a diameter of 20 cm and a thickness of other parts than the center hub was 3.6 mm.

During the assembly process of the recording medium, a dispersion of spores of Aspergillus niger was sprayed over the inner circumferential side of the spacer facing to the sealed space (5) and the whole outer circumferential side of the center hub to previously provide a mold original source.

Immediately after prepared, the Samples 1 to 3 thus prepared were allowed to stand under environmental condition of a temperature of 28° C. and a relative humidity of 95% over 14 days. The Samples 1 to 3 after standing were investigated for propagation of molds. the results are shown in Table 1.

In the Table 1, the open circle "O" indicates no growth of mold myclium, the open triangle "Δ" indicates slight growth of mold myclium solely and the cross mark "X" indicates very abundant growth of mold mycelium and spore, the same indications as above being applied for all of the subsequent Tables.

The Samples 1 to 3 after standing were investigated for the CN ratio and error rate by actual recording and reproducing. There could be obtained constantly expected performance as the CN ratio was as high as about 45 dB at a band width of 30 KHz and the error rate (uncorrected) was as small as about $10^{-5}$ or so with a high fungi-proofing activity. A light source was a semi-conductor laser with a wave length of 830 nm and strength of the laser light on the recording layer was 10 mW when recorded and 2 mW when reproduced, and the scanning speed was 10 m/sec. and the frequency was 1 MHz (pulse with a duty ratio of 50%). The Samples 1 to 3 before standing had the CN ratio of about 45 dB at a band width of 30 KHz and the error rate (uncorrected) of about $10^{-5}$ or so.

TABLE 1

| | Sample | | |
|---|---|---|---|
| Observed place | Sample 1 | Sample 2 | Sample 3 |
| Sealed space side part of base panel | O | O | O |
| Sealed space side part of spacer | O | O | O |
| Sealed space side part of center hub | O | O | O |
| Recording layer | O | O | O |
| Outer surface of base panel | O | O | O |

As seen above, the present Samples 1 to 3 can exert a sufficient fungi-proofing effect, which is believed that the fungicide included in the material for the base panel would evaporate and act upon a sealed space so as to bring the interior of said sealed space to the atmosphere unsuited for molds.

Comparative Experiment 1

Following the same procedures as in Experiment 1 except that the fungicide was omitted, there were prepared 3 comparative recording media. They were designated "Comparative Sample 1" to "Comparative Sample 3", respectively.

The Comparative Samples 1 to 3 were allowed to stand and propagation of molds after standing was investigated in the same manner as in Experiment 1. The results are shown in Table 2.

As seen from the results in Table 2, the Comparative Samples 1 to 3 showed abundant growth of molds, insufficient action of a laser light upon the recording layer and the deteriorated recording layer, whereby similar recording and reproducing to Experiment 1 could not be carried out at all, and then they could not be put to practical use. In Comparative Samples 2 and 3, the adhesive layer was remarkably deteriorated and the sealed structure was broken.

TABLE 2

| | Sample | | |
|---|---|---|---|
| Observed place | Comparative Sample 1 | Comparative Sample 2 | Comparative Sample 3 |
| Sealed space side part of base panel | x | x | x |
| Sealed space side part of spacer | x | x | x |
| Sealed space side part of center hub | x | x | x |
| Recording layer | x | x | x |
| Outer surface of base panel | ○ | Δ | Δ |

Experiment 2

Following the same procedures as in Experiment 1 except that a dispersion of spores of *Aspergillus niger* was sprayed onto the outer surface of both base panels to provide a mold original source, there were prepared 3 recording media of this invention. They were designated "Sample 4" to "sample 6", respectively.

The Samples 10 to 12 were allowed to stand and propagation of molds after standing was investigated in the same manner as in Experiment 1. The results are shown in Table 3.

By using the so-left Sample 4 to 6, recording and reproducing were carried out in the same manner as in Experiment 1, whereby there was obtained constantly expected performance as the CN ratio at a band width of 30 KHz was about 45 dB and the error rate (uncorrected) was about $10^{-5}$ or so, with a high fungi-proofing activity.

TABLE 3

| | Sample | | |
|---|---|---|---|
| Observed place | Sample 4 | Sample 5 | Sample 6 |
| Base panel | ○ | ○ | ○ |
| Spacer | ○ | ○ | ○ |
| Center hub | ○ | ○ | ○ |
| Label | ○ | ○ | ○ |

Comparative Experiment 3

Following the same procedures as in Experiment 2 except that there was omitted the fungicide, there were prepared 3 comparative recording media. They were designated "Comparative Sample 4" to "Comparative Sample 6", respectively.

The Comparative Samples 4 to 6 were allowed to stand and propagation of molds after standing was investigated in the same manner as in Experiment 1. The results are shown in Table 4.

As seen from the results in Table 4, the so-left Comparative Samples 4 to 6 showed abundant growth of molds, insufficient action of a laser light upon the recording medium owing to the outer surface of the base panel being covered with molds, whereby similar recording and reproducing to Experiment 1 could not be accomplished at all. They could not be put to practical use. In the Comparative Samples 4 and 5, abundant growth of molds was seen even over the label surface so that the display part of the label could not be read.

TABLE 4

| | Sample | | |
|---|---|---|---|
| Observed place | Comparative Sample 4 | Comparative Sample 5 | Comparative Sample 6 |
| Base panel | x | x | x |
| Spacer | x | Δ | Δ |
| Center hub | Δ | Δ | Δ |
| Label | x | x | Δ |

Experiment 3

Following the same procedures as in Experiment 1 except that the same fungicide as in Experiment 1 was included into the material for the spacer at a proportion of 0.3% by weight, there wre prepared 3 recording media of this invention. They were designated "Sample 7" to "Sample 9", respectively.

The Samples 7 to 9 were allowed to stand and propagation of molds after standing was investigated in the same manner as in Experiment 1. The results are shown in Table 5.

By using the so-left Sample 7 to 9, recording and reproducing were carried out in the same manner as in Experiment 1, whereby there was constantly obtained expected performance as the CN ratio at a band width of 30 KHz was about 45 dB and the error rate (uncorrected) was about $10^{-5}$ or so, with a high fungi-proofing activity.

TABLE 5

| | Sample | | |
|---|---|---|---|
| Observed place | Sample 7 | Sample 8 | Sample 9 |
| Sealed space side part of base panel | ○ | ○ | ○ |
| Sealed space side part of spacer | ○ | ○ | ○ |
| Sealed space side part of center hub | ○ | ○ | ○ |
| Recording layer | ○ | ○ | ○ |
| Outer surface of base panel | ○ | ○ | ○ |

Experiment 4

Following the same procedures as in Experiment 1 except that the same fungicide as used in Experiment 1 was included into the material for the center hub at a proportion of 0.3% by weight, there were prepared 3 recording media of this invention. They were designated "Sample 10" to "Sample 12", respectively.

The Samples 10 to 12 were allowed to stand and propagation of molds after standing was investigated in the same manner as in Experiment 1. The results are shown in Table 6.

By using the so-left Sample 10 to 12, recording and reproducing were carried out in the same manner as in Experiment 1, whereby there was constantly obtained expected performance as the CN ratio at a band width of 30 KHz was about 45 dB and the error rate (uncorrected) was about $10^{-5}$ or so, with a high fungi-proofing activity.

TABLE 6

| | Sample | | |
|---|---|---|---|
| Observed place | Sample 10 | Sample 11 | Sample 12 |
| Sealed space side part of base panel | ○ | ○ | ○ |
| Sealed space side part of | ○ | ○ | ○ |

TABLE 6-continued

| Observed place | Sample 10 | Sample 11 | Sample 12 |
|---|---|---|---|
| spacer | | | |
| Sealed space side part of center hub | O | O | O |
| Recording layer | O | O | O |
| Outer surface of base panel | O | O | O |

Experiment 5

Following the same procedures as in Experiment 1 except that the 2-octylisothiazolin-3-one represented by the under-mentioned structural formula was used as a fungicide and incorporated in a hydrophilic colloid dispersion medium at the recording layer at a proportion of 0.01% by weight, there were prepared 3 recording media of this inventon. They were designated "Sample 13" to "Sample 15", respectively.

Structural formula

The Samples 13 to 15 were allowed to stand and propagation of molds after standing was investigated in the same manner as in Experiment 1. The results are shown in Table 7.

By using the so-left Samples 13 to 15, recording and reproducing were carried out in the same manner as in Experiment 1, whereby there was constantly obatianed expected performance as the CN ratio at a band width of 30 KHz was about 45 dB and the error rate (uncorrected) was about $10^{-5}$ or so, with a high fungi-proofing activity. And, there was not brought about at all a harmful influence upon the recording layer caused by inclusion of the fungicide.

TABLE 7

| Observed place | Sample 13 | Sample 14 | Sample 15 |
|---|---|---|---|
| Sealed space side part of base panel | O | O | O |
| Sealed space side part of spacer | O | O | O |
| Sealed space side part of center hub | O | O | O |
| Recording layer | O | O | O |
| Outer surface of base panel | O | O | O |

Experiment 6

Following the same procedures as in Experiment 1 except that there was used 1% by weight solution of the same fungicide as used in Experiment 1 in methanol and the solution was coated in a coated amount of the fungicide of $10^{-3}$ g/cm² over the surface of other sealed space side parts of the base panel than the recording layer and the pre-groove layer to provide a coated film containing the fungicide, there were prepared 3 recording media of this invention. They were designated "Sample 16" to "Sample 18", respectively.

The Samples 16 to 18 were allowed to stand and propagation of molds after standing was investigated in the same manner as in Experiment 1. The results are shown in Table 8.

By using the so-left Samples 16 to 18, recording and reproducing were carried out in the same manner as in Experiment 1, whereby there was constantly obatined expected performance as the CN ratio at a band width of 30 KHz was about 45 dB and the error rate (uncorrected) was about $10^{-5}$ or so, with a high fungi-proofing activity.

TABLE 8

| Observed place | Sample 16 | Sample 17 | Sample 18 |
|---|---|---|---|
| Sealed space side part of base panel | O | O | O |
| Sealed space side part of spacer | O | O | O |
| Sealed space side part of center hub | O | O | O |
| Recording layer | O | O | O |
| Outer surface of base panel | O | O | O |

Experiment 7

Following the same procedures as in Experiment 1 except that the recording layer was constructed to be composed of a thin film of tellurium with a thickness of 300 A formed by vacuum evaporation, there were prepared 3 recording media of this invention. They were designated "Sample 19" to "Sample 21", respectively.

The Samples 19 to 21 were allowed to stand and propagation of molds after standing was investigated in the same manner as in Experiment 1. The results are shown in Table 9.

By using the so-left Samples 19 to 21, there were actually conducted recording and reproducing to give a similar performance as expected constantly.

TABLE 9

| Observed place | Sample 19 | Sample 20 | Sample 21 |
|---|---|---|---|
| Sealed space side part of base panel | O | O | O |
| Sealed space side part of spacer | O | O | O |
| Sealed space side part of center hub | O | O | O |
| Recording layer | O | O | O |
| Outer surface of base panel | O | O | O |

Experiment 8

According to the construction as illustrated in FIG. 4, the fungicide, α-bromo-cinnamyl aldehyde, represented by the following structural formula was incorporated into the material for an outer frame made of polyvinyl chloride resin at a proportion of 1% by weight and then 3 containers of this invention were prepared which is put therein the under-mentioned disc-type recording media and had a sealed structure. They were designated Sample 22 to Sample 24, respectively.

Structural formula

The container had an outer dimension of 230 mm×260 mm×6 mm and a weight of 300 g. The shutter was made of aluminium and the label was made of paper.

In the above-mentioned containers, the same disc-type recording media as used in Experiment 1 which is shown in FIG. 1 were put.

Then, a dispersion of spores of *Aspergillus niger* was sprayed onto the recording medium at the outer surface of the base panels (1) and (2) prior to the receipt in a container, whereby an original source of molds was previously provided.

Immediately after the said Samples 22 to 24 which are put such a recording medium was prepared, the Samples were allowed to stand under the environment of a temperature of 28° C. and a relative humidity of 95% over 14 days. Thereafter, propagation of molds was investigated for the Samples 22 to 24 thus left at the base panels (1), (2), the internal and external surfaces of the cartridge outer frame (51) and the circumferential part of the window part (53), respectively. The results are shown in Table 10.

Then, by conducting actual recording and reproducing, there were investigated the CN ratio and error rate for the Samples 22 to 24. It was found that expected performance can be constantly attained as the CN ratio at a band width of 30 KHz was as high as about 45 dB, the error rate (uncorrected) was as low as about $10^{-5}$ and the fungi-proofing effect was high. As a light source, there was employed a semi-conductor laser with a wave length of 830 nm and strength of this laser light on the recording layer was 10 mW when recorded and 2 mW when reproduced, with a scanning speed of 10 m/sec. and a frequency of 1 MHz (pulse with a duty ratio of 50%). The Samples 22 to 24 had, before standing, the CN ratio of about 45 dB at a band width of 30 KHz and the error rate (uncorrected) of about $10^{-5}$ or so.

TABLE 10

| | Observed place | | | |
| | Recording medium | container | | |
| | | Inner surface of | Outer surface of | Circumferential part |
| Sample | Base panel (1), (2) | outer frame (51) | outer frame (51) | of window part (53) |
|---|---|---|---|---|
| Sample 22 | ○ | ○ | ○ | ○ |
| Sample 23 | ○ | ○ | ○ | ○ |
| Sample 24 | ○ | ○ | ○ | ○ |

Comparative Experiment 2

Following the same procedures as in Experiment 8 except that the fungicide was omitted, there were prepared 3 comparative containers which are put the recoridng medium with the same mold original source as used for Experiment 8. They were designated Comparative Sample 4 to Comparative Sample 6, respectively.

The Comparative Samples 4 to 6 were allowed to stand and propagation of molds was investigated after standing in the same manner as in Experiment 8. The results are shown in Table 11.

The Comparative Samples 4 to 6 after standing shows, as seen from the results in Table 11, abundant propagation of molds, broken sealed structure of the container and no sufficient action of laser light on the recording layer owing to the surface of the base panels (1) and (2) of the recording medium being covered with grown molds. Therefore, the Samples could not accomplish at all recording and reproducing like in Experiment 8 and were unable to be put to practical use.

TABLE 11

| | Observed place | | | |
| | Recording medium | container | | |
| | | Inner surface of | Outer surface of | Circumferential part |
| Sample | Base panel (1), (2) | outer frame (51) | outer frame (51) | of window part (53) |
|---|---|---|---|---|
| Comparative sample 4 | x | x | Δ | Δ |
| Comparative sample 5 | x | x | x | x |
| Comparative sample 6 | x | x | Δ | Δ |

EXPERIMENT 9

In the same constitution as shown in FIG. 4, a fungicide keeping boxes (55) were positioned at the corner parts (56) on all sides, respectively, and carried with each 5 g of the same fungicide as used for Experiment 8, whereby there were prepared 3 containers of this invention which had a sealed structure and was put a recording medium having provided with the same mold origical source as used for Experiment 8. They were designated Sample 25 to Sample 27.

The Samples 25 to 27 were allowed to stand and propagation of molds was investigated after standing in the same manner as in Experiment 8. The results are shown in Table 12.

The so-left Samples 25 to 27 were applied for recording and reproducing in the same manner as in Experiment 8. There could be attained constantly expected performance as the CN ratio was about 45 dB at a band width of 30 KHz and the error rate (uncorrected) was about $10^{-5}$ or so, with a high fungi-proofing activity.

TABLE 12

| | Observed place | | | |
| | Recording medium | container | | |
| | | Inner surface of | Outer surface of | Circumferential part |
| Sample | Base panel (1), (2) | outer frame (51) | outer frame (51) | of window part (53) |
|---|---|---|---|---|
| Sample 25 | ○ | ○ | ○ | ○ |
| Sample 26 | ○ | ○ | ○ | ○ |
| Sample 27 | ○ | ○ | ○ | ○ |

Experiment 10

Following the constitution as shown in FIG. 7, there was prepared a jukebox-type container, the outer wall side of which was provided with a coated film containing the fungicide of the following structural formula, 2-octylisothiazolin-3-one. To this container were mounted an optical disc carrier and an optical disc player to make up a reproducing system.

Structural formula

In the above container, 50 sheets of a disc-type recording medium, which had previously recorded information and kept the same mold original source as used in Experiment 8, were put by arranging them one behind another. Then, the whole reproducing system was allowed to stand under the environmental condition of a temperature of 28° C. and a relative humidity of 95% over 14 days.

Propagation of molds was investigated for the so-left reproducing system to show that no propagation of mold mycelia was seen at all in the container, 50 sheets of recording media, optical disc carrier and optical disc player and movement of movable parts in the optical disc carrier was satisfactory as expected state.

Next, actual reproducing process was carried out by the so-left reproducing system and all 50 sheets of recording media showed constantly expected performance as the CN ratio at a band width of 30 KHz was about 45 dB and the error rate (uncorrected) was about $10^{-5}$ or so, with a high fungi-proofing activity.

Comparative Experiment 3

Following the same procedures as in Experiment 10 except that there was not employed the fungicide, a reproducing system was prepared, a container was received therein and then the system was allowed to stand in the same manner as in Experiment 10.

In the so-left reproducing system, propagation of molds was investigated to show that abundant growth of mold mycelia and spores was seen over the internal and external surfaces of the container and the surface of the base panels for all 50 sheets of recording media and, further, poor movement of movable parts in the optical disc carrier was brought about owing to mold propagation. Moreover, reproducing process was tried by the use of this reproducing system, but reproducing could not be achieved at all owing to abundant growth of molds.

We claim:

1. An optical information recording and reproducing medium comprising a fungicide, said medium containing at least one layer selected from the group consisting of a layer comprising fine metal particle dispersed in a hydrophilic colloid dispersion medium; a layer comprising a metal or an alloy formed by a vacuum evaporation method or a sputtering method; and a layer comprising a coloring substance or consisting essentially of a polymeric substance.

2. The optical information recording and reproducing medium according to claim 1, wherein said medium comprises a support and a recording layer, and said support contains said fungicide in the material thereof.

3. The optical information recording and reproducing medium according to claim 1, wherein said medium comprises a support and a recording layer, and said recording layer contains said fungicide in the material thereof.

4. The optical information recording and reproducing medium according to claim 1, wherein said medium comprises a support, a recording layer and a pre-groove layer, and said pre-groove layer contains said fungicide in the material thereof.

5. The optical information recording and reproducing medium according to claim 1, wherein said medium has a center hub and said center hub contains said fungicide in the material thereof.

6. The optical information recording and reproducing medium according to claim 1, wherein said medium has a spacer and said spacer contains said fungicide in the material thereof.

7. The optical information recording and reproducing medium according to claim 1, wherein an adhesive used for forming said medium contains said fungicide.

8. The optical information recording and reproducing medium according to claim 1, wherein a thin film layer containing said fungicide is coated on a component of said medium.

9. The optical information recording and reproducing medium according to claim 1, wherein the fungicide is at least one selected from the group consisting of amide-type compounds, benzimidazole-type compounds, $\alpha,\beta$-unsaturated carbonyl compounds, inert chlorine compounds, phenol compounds, N-haloalkylthio compounds and thiocyanate-type compounds.

10. A method for preventing an optical information recording and reproducing medium from mildewing, comprising having a fungicide included in, or provided on, a component of said medium, or putting said medium in a container comprising a fungicide included in, or provided on, a component of said container, said medium containing at least one layer selected from the group consisting of a layer comprising fine metal particles dispersed in a hydrophilic colloid dispersion medium; a layer comprising a metal or an alloy formed by a vacuum evaporation method or a sputtering method; and a layer comprising a coloring substance or consisting essentially of a polymeric substance.

11. The method for preventing an optical information recording and reproducing medium from mildewing according to claim 10, wherein said medium comprises a support and a recording layer, and said support contains said fungicide in the material thereof.

12. The method for preventing an optical information recording and reproducing medium from mildewing according to claim 10, wherein said medium comprises a support and a recording layer, and said recording layer contains said fungicide in the material thereof.

13. The method for preventing an optical information recording and reproducing medium from mildewing according to claim 10, wherein said medium comprises a support, a recording layer and a pre-groove layer, and said pre-groove layer contains said fungicide in the material thereof.

14. The method for preventing an optical information recording and reproducing medium from mildewing according to claim 10, wherein said medium has a center hub and said center hub contains said fungicide in the material thereof.

15. The method for preventing an optical information recording and reproducing medium from mildewing according to claim 10, wherein said medium has a spacer and said spacer contains said fungicide in the material thereof.

16. The method for preventing an optical information recording and reproducing medium from mildewing according to claim 10, wherein an adhesive used for forming said medium contains said fungicide.

17. The method for preventing an optical information recording and reproducing medium from mildewing according to claim 10, wherein a thin film layer containing said fungicide is coated on a component of said medium.

18. The method for preventing an optical information recording and reproducing medium from mildewing according to claim 10, wherein the fungicide is at least one selected from the group consisting of amide-type compounds, benzimidazole-type compounds, $\alpha,\beta$-unsaturated carbonyl compounds, inert chlorine compounds, phenol compounds, N-haloalkylthio compounds and thiocyanate-type compounds.

19. The method for preventing an optical information recording and reproducing medium from mildewing according to claim 10, wherein said container has therein a box holding said fungicide.

20. The method for preventing an optical information recording and reproducing medium from mildewing according to claim 10, wherein said container contains said fungicide in the material thereof.

21. The method for preventing an optical information recording and reproducing medium from mildewing according to claim 10, wherein an adhesive to be used for forming said container contains said fungicide.

22. The method for preventing an optical information recording and reproducing medium from mildewing according to claim 10, wherein a thin film layer containing said fungicide is coated on a component of said container.

23. The combination of an optical information recording and reproducing medium and a container for storing said optical information recording and reproducing medium, at least one of said optical information recording and reproducing medium and said container comprising a fungicide wherein said fungicide is in a layer selected from the group consisting of a layer comprising fine metal particles dispersed in a hydrophilic colloid dispersion medium; a layer comprising a metal or an alloy formed by a vacuum evaporation method or a sputtering method; and a layer comprising a coloring substance or consisting essentially of a polymeric substance.

24. The optical information recording and reproducing medium according to claim 23, wherein said container has therein a box holding said fungicide.

25. The optical information recording and reproducing medium according to claim 23, wherein said container contains said fungicide in the material thereof.

26. The optical information recording and reproducing medium according to claim 23, wherein an adhesive to be used for forming said container contains said fungicide.

27. The optical information recording and reproducing medium according to claim 23, wherein a thin film layer containing said fungicide is coated on a component of said container.

* * * * *